United States Patent [19]

Vartiainen

[11] Patent Number: 4,466,826
[45] Date of Patent: Aug. 21, 1984

[54] PROCESS FOR RECOVERING METAL VALUES FROM ALLOY SCRAPS

[75] Inventor: Osmo Vartiainen, Helsinki, Finland
[73] Assignee: OV-Eng Oy, Helsinki, Finland
[21] Appl. No.: 461,454
[22] Filed: Jan. 27, 1983
[51] Int. Cl.³ .............................................. C22B 23/06
[52] U.S. Cl. ........................................ 75/63; 75/82; 420/580
[58] Field of Search ...................................... 75/82, 63
[56] References Cited

U.S. PATENT DOCUMENTS 4,251,266 2/1981 Larsson et al. .......................... 75/82

Primary Examiner—M. J. Andrews
Attorney, Agent, or Firm—Brooks, Haidt, Haffner & Delahunty

[57] ABSTRACT

A process for recovering metal values from Ni and Co based superalloy scraps containing Cr, W, and Mo is disclosed. The process is a multistep pyrometallurgical oxidation process wherein the metal is successively oxidized by oxygen, $Fe_2O_3$ or both in a tiltable electric arc furnace with slag withdrawal after each oxidation step in order to obtain a substantially pure Ni/Co alloy melt.

10 Claims, 2 Drawing Figures

Relative oxygen affinities for important constituents of superalloy scrap.

Relative oxygen affinities for important constituents of superalloy scrap.

System Na$_2$O-CaO-SiO$_2$. The recommended refining slag composition is shown with the cross.

PROCESS FOR RECOVERING METAL VALUES FROM ALLOY SCRAPS

BACKGROUND OF THE INVENTION

The present invention relates to a process for recovering metal values from based alloy scraps based on Ni, Co, or both and especially superalloy scraps but also high alloy chromium bearing and corrosion resisting alloy scraps with considerable amounts of valuable metals. The scrap is becoming increasingly contaminated nowadays because of the higher content of alloys and other tramp elements. The utility value of such scraps can be considerably increased by separating the valuable metals into marketable, technically useful products.

Nickel and cobalt based superalloys typically contain about 50 to 70 percent nickel and/or cobalt, 15 to 30 percent chromium, and the balance is made up of molybdenum, tungsten, columbium, titanium, aluminum, iron, manganese, silicon, and carbon. Contaminating metals may include copper, lead, zinc, and tin. Other contaminants include oil, moisture, rags, wood, earth, and corundum grinding debris.

Alloy scraps in the following forms are suitable for refining: turnings, catalysts, uprunnings, grindings, sludges, muds, spills, off-grade multi-metals and ingots. Powder metallurgical products are normally not suitable. Table 1 gives the analyses of some typical superalloy scraps.

TABLE 1

| Analysis of typical superalloy scraps | | |
|---|---|---|
| Analysis | Average % | Normal limits % |
| Ni | 39.3 | 1.5–63 |
| Co | 21.2 | 7–56 |
| Cr | 17.0 | 8–32 |
| Mo | 3.9 | 2–10 |
| Ti | 1.8 | 0.3–5 |
| Al | 1.7 | 0.1–6 |
| W | 2.6 | 1–17.5 |
| Cu | 0.02 | 0.05–0.5 |
| Ta | 0.41 | 4.25–9 |
| V | 0.03 | 0.01–1.0 |

The recovery of metal values from the superalloy scraps contemplated herein has been tested so far mainly by using hydro- and pyrometallurgical methods.

The hydrometallurgical leaching and chemical purification methods are successful only with scrap in fine form like drillings, turnings, etc. Leaching of scrap in big pieces is slow, and is possibly only by the heap leaching method on an industrial scale. This will not be practical for a long time.

In order to speed up the leaching, metallic superalloy scrap can be carborized at melting temperatures, and after cooling be crushed and ground after which it can be selectively leached so that the metals to be recovered can be hydrometallurgically refined by well-known methods.

Better results from the practical and economic point of view have been obtained by pyrometallurgical smelting methods in controlled conditions, but the practical industrial applications are very rare and they have been only partly successful.

The object of the present invention is to provide a process for refining the metal alloy product scraps to produce Ni/Co-alloys with the required purities and to recover the middle products for further purification by e.g. well-known metallurgical and chemical methods choosing the most suitable one for each type of slag.

SUMMARY OF THE INVENTION

According to the present invention there is now provided a process for recovering metal values from alloy scraps by (a) first oxidizing the metal melt to such an extent that tungsten will remain substantially unoxidized, maintaining a slag basicity (ratio of the basic components to the acid ones in slag) of 2–2.5, and removing a chromium containing slag so formed;

(b) further oxidizing the metal melt from step (a) to such an extent that molybdenum will remain substantially unoxidized, and removing a chromium and tungsten containing slag so formed;

(c) further oxidizing the metal melt from step (b) at a slag basicity of 1.5–2.0 to bring the chromium content thereof to 0.5–1%, and removing the slag so formed;

(d) repeatedly oxidizing the metal melt from step (c) in admixture with a sodium containing slagging agent to obtain a slag basicity of 2.5–3, and removing a molybdenum containing slag after each treatment.

The principal object of the above-mentioned refining steps is to bring the purity of the Ni/Co-melt to a required level of less than 0.05% of components such as Cr, Mo, W, etc.

DESCRIPTION OF THE PREFERRED EMBODIMENTS

The present process is based mainly on pyrometallurgical treatment of scrap resulting in the separation of Ni, Co, and Fe (also Cu) from other metals which, again, are obtained concentrated in intermediate products. This is a meltmetallurgical process and the separation of metals is executed by slagging.

To separate metals selectively during the smelting process, the following factors have to be taken into consideration:

oxidizing conditions, partial pressure of oxygen
reducing conditions
temperature
solubility of metals in iron
reactions between metals, oxidizing/reducing reactions
partial pressure of metals
content and properties of slag Slag formation is based on the oxidation of the metals in accordance with the following general formula $$Me + O = MeO$$

the equilibrium constant being

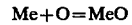

$$K = \frac{/MeO/}{/Me/} \cdot /O/$$

Because the oxidation order is affected by the proportional quantities of metals, some changes between elements in the affinity series can happen or the reactions do not go to the complete end if the ratio differences of metals are very great. The reactions between two metals then happen in principle as follows:

$$Me_1O + Me_2 = Me_2O + Me_1$$

$$K = \frac{/Me_2O/ \cdot /Me_1/}{/Me_1O/ \cdot /Me_2/}$$

Figure 1:
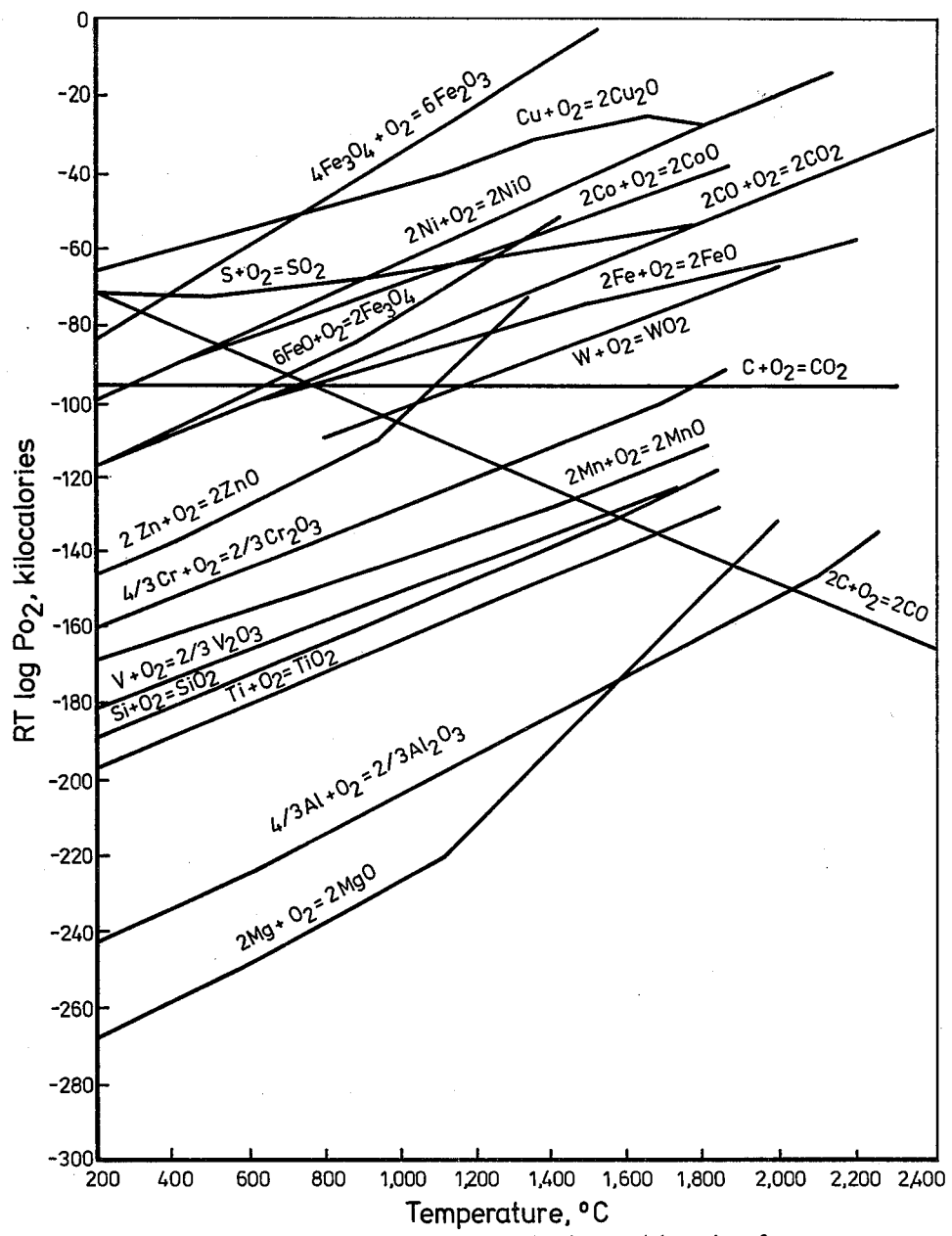
FIG. 1 illustrates graphically the relative oxygen affinities of some important components of the superalloy scrap.

The affinity of general alloying metals to oxygen in the temperature range 1500°–1700° C. follows the order (Ca has the biggest affinity): Cu—Ni—Co—Mo—W—Fe—Cr—Nb—Ta—Mn—V—Si—Ti—Mg—Al—Ca. Relative affinities of the constituents in question are also shown graphically in FIG. 1.

Solubility of various metals in iron is a significant phenomenon on this occasion and the metals can thus be divided into the following groups:
(1) completely soluble Al, Cu, Mn, Ni, Co, Si, Sb, Ti, Ce
(2) partially soluble Cr, V, Mo, W, Sn, Pt
(3) practically insoluble Pb, Ag, Bi
(4) metalloids, partially soluble C, S, P, O, H, N, As, Se
(5) gaseous state at temperatures of steelmaking Na, Li, Mg, Ca, Zn, Cd, Hg.

Aiming at clean Ni—Co—Fe alloys it is possible to oxidize such alloying metals as Cr, Mn, V, Ti, and to get them to the slag. W and Mo require much more closely controlled conditions and normally multistep purification treatment. To control the copper content of the final product it is obvious that it has to be looked after selecting the raw materials to be refined.

The variation of free energy determines in which direction the processes occur in systems with constant temperature. Pressure is termed the isobaric isothermal potential, or thermodynamic potential (Table 2).

One can note from Table 2 that the refining problems will be concentrated mainly on how to separate Cr, Mo, Ti, Al, and W from the alloy raw materials in question. Also Ta and V in certain steel scrap types have to be removed in addition to the aforesaid.

As has been shown theoretically, the affinities of Al and Ti as well as V and Cr to oxygen are considerable compared to those of Mo and W.

The effect of temperature is quite strong. At high temperatures a large amount of oxygen can coexist with chromium in the bath without reacting with it. Thus the process must be carried out at the least admissible temperature.

One has to take into account that silicon and manganese prevent chromium from being oxidized and have a reducing effect on chromiumoxide.

When the content of $Cr_2O_3$ of the slag exceeds about 8% the slag viscosity increases and thus impairs the process of heat transfer. It is important to adjust slag conditions carefully during the process when removing the chromium.

When removing chromium from metal to slag also dephosphorization is carried out at the same time if that comes in question.

OXIDATION OF MOLYBDENUM

Because the affinity of molybdenum to oxygen is small compared to iron the elements like C, P, Mn, Si, Cr, and Al have to be below certain limits before demolybdenization is possible. The oxygen content in molten steel has to exceed a certain level.

To get molybdenum oxidized far enough one has to take into account Mo-equilibrium between slag and molten steel. It means that the demolybdenization process with slag removal has to be repeated a few times.

As an oxidizing medium not only can be used but also iron oxides or alkalimetaloxides which form double salts of molybdenum, thus Mo being in the slag as $MoO_2$ and/or e.g. $Na_2O \cdot 5MoO_3$, $CaMoO_4$, etc.

OXIDATION OF TUNGSTEN

Tungsten can be oxidized at the same time as molybdenum is oxidized step by step. There is a certain selectivity between Mo and W when the oxidation is made in several steps at relatively low temperatures.

OXIDATION OF VANADIUM

Vanadium is easily oxidized to $V_2O_3$ and $V_2O_5$ with high recoveries in the slag leaving to the steel normally less than 0.05%. Vanadium can then be chemically extracted from slag.

TABLE 2

| | Reaction | | | Temperature range K. | ΔF.° | Logarithm of oxide dissociation pressure at 1727 K. |
|---|---|---|---|---|---|---|
| Free energy change with dissociation pressure in oxidation reactions of metals involved in steelmaking | | | | | | |
| 3/4 Al | + $O_2$ = | 2/3 | $Al_2O_3$ | 930–2318 | −257500 +44.3 T | −17.7 |
| Ti | + $O_2$ = | | $TiO_2$ | 298–2080 | −217500 +41.4 T | −13.6 |
| 4/3 V | + $O_2$ = | 2/3 | $V_2O_5$ | 298–1995 | −206800 +38.9 T | not found |
| 2 Mn | + $O_2$ = | 2 | MnO | 1500–2051 | −190800 +39.25 T | −11.5 |
| 4/3 Cr | + $O_2$ = | 2/3 | $Cr_2O_3$ | 1868–2500 | −183740 +44.21 T | −10.2 |
| 2 Fe | + $O_2$ = | 2 | FeO | 1808–2000 | −111250 +21.67 T | −6.9 |
| 6 FeO | + $O_2$ = | 2 | $Fe_3O_4$ | 298–1642 | −149250 +59.80 T | |
| Mo | + $O_2$ = | | $MoO_2$ | 298–1200 | −133600 +43.07 T | −4.0 |
| W | + $O_2$ = | | $WO_2$ | 298–1400 | −131250 +38.05 T | −5.0 |
| 2 Ni | + $O_2$ = | 2 | NiO | 1725–2200 | −125300 +51.96 T | −3.3 |
| 4 Cu | + $O_2$ = | 2 | $Cu_2O$ | 1509–1573 | −65260 +21.44 T | −0.6 |

OXIDATION OF CHROMIUM

Oxidation and reduction of Cr in melts has been researched very thoroughly in the literature. In the pratice of the steelmaking technology the main problems are experienced frequently. In the following list there are given some features to remove Cr from melt by oxidizing:

OXIDATION OF TITANIUM

The affinity of titanium to oxygen is very intensive so slagging of titanium should not cause any difficulties when handling the metal compositions in question.

EXAMPLE

Refining of superalloy scraps

The description is based on theoretical, laboratory and practical scale tests executed with superalloy scrap of various types. The scrap material used in the practical tests was taken direct from cases, barrels, etc. into which the scrap was sorted and packed by scrap receivers. The scrap was not pre-treated by, for instance, washing before melting.

Melting equipment

Refining was done as a batch process in a conventional three-electrode (graphite) electric arc furnace which could be emptied by tilting it so that the slag and the metal was easily obtained separately. The furance was able to reach a melting temperature of about 1800° C.

Treatment of metal melt and slags

The process requires the treatment and removal of a number of different slags that must be kept apart. It must be possible to quickly remove the metal from the furnace and lead it into the casting machine refining.

The tilting mechanism of the furnace was so constructed that the furnace could be easily and quickly be completely emptied or that the furnace could remain tilted at any angle for the removal of slag.

Chromium and tungsten removal

Superalloy scraps containing W and Mo besides Cr were refined in two stages the first concentrating on the removal of Cr and W and the other on Mo removal, each stage again having two or three different treatments.

In the first treatment of the first stage, after down smelting, the slagging material is added together with the oxidizer to the scrap (in a 5-tonne furnace 1½-2 tonnes). Oxidization can be achieved using either only oxygen or iron oxide or then a combination of both.

In the first treatment, the Cr content is decreased to such a level that W dose not yet oxidize, i.e. some 10% when the initial content was 20-30%. The amount of Cr oxidizer is calculated according to $$Fe_2O_3 + 2Cr = Cr_2O_3 + 2Fe$$

at an oxygen utilisation ratio of 95-100%. If reduced iron is not desired in the metal product, the $Fe_2O_3$ can be exchanged for liquid oxygen. In the executed tests, the amount of oxygen gas was approx. 25% of the total oxygen amount. When the oxygen is fed under the surface of the melt with lance, a good mix of melt and slagging material is achieved at the same time as the temperature of the melt is kept sufficiently high with the aid of the electrodes maintaining the electric arc.

Lime and silica sand are used as slag formers thus that the slag basicity is 2-2.5. Fluorspar may be used to decrease the slag's viscosity. The slag's Cr content with the above treatment is 35-40%.

In the second treatment of the first stage, the Cr content of the metal phase is decreased to about ¼ of the level of the first treatment, i.e. 2-3% by continuing the oxidization with oxygen and $Fe_2O_3$ for 5-7 minutes adding also slagging material as in the first treatment. The fluidity of the slag can be improved by a small amount of fluorspar.

In this treatment, the W content decreases to a level of some 2%, the initial content being some 8%. The W oxidation to $WO_2$ has to be calculated at an oxygen utilisation ratio of some 95% when defining the amount of oxidizer for this treatment. The Mo does not oxidize at this stage. The Cr content can be expected to be some 20% and the W content some 7% in the slag of the second treatment.

In the third treatment of the first stage, the Cr content of the metal phase can be reduced to less than 0.05% by continuing the oxidization for some five minutes using both oxygen and $Fe_2O_3$ and adding slagging material, i.e. lime and silica sand and the basicity being some 1.5-2.0. The W content of the metal phase is then 0.2-0.5% and the Cr content of the slag 12-15% and the W content 4-5% in this treatment. When the Cr content of the metal phase is less than one per cent, the Mo starts oxidizing, e.g. in this work from the level of 1.5% to about 1.0%.

If a sufficiently low Cr content has not been achieved with these three treatments, it will be achieved in connection with the Mo removal. In fact, Mo removal can start when the Cr content is 0.5-1% which may be achieved with two treatments in the first stage when the process has been well tested.

W removal from the metal phase continues during the treatments of the second stage. In the executed tests a Cr content of 0.01% was achieved while the lowest W content achieved was 0.08%. The W content of the metal phase is not considerably dependent on the initial W level of the scrap.

Molybdenum removal

Figure 2:
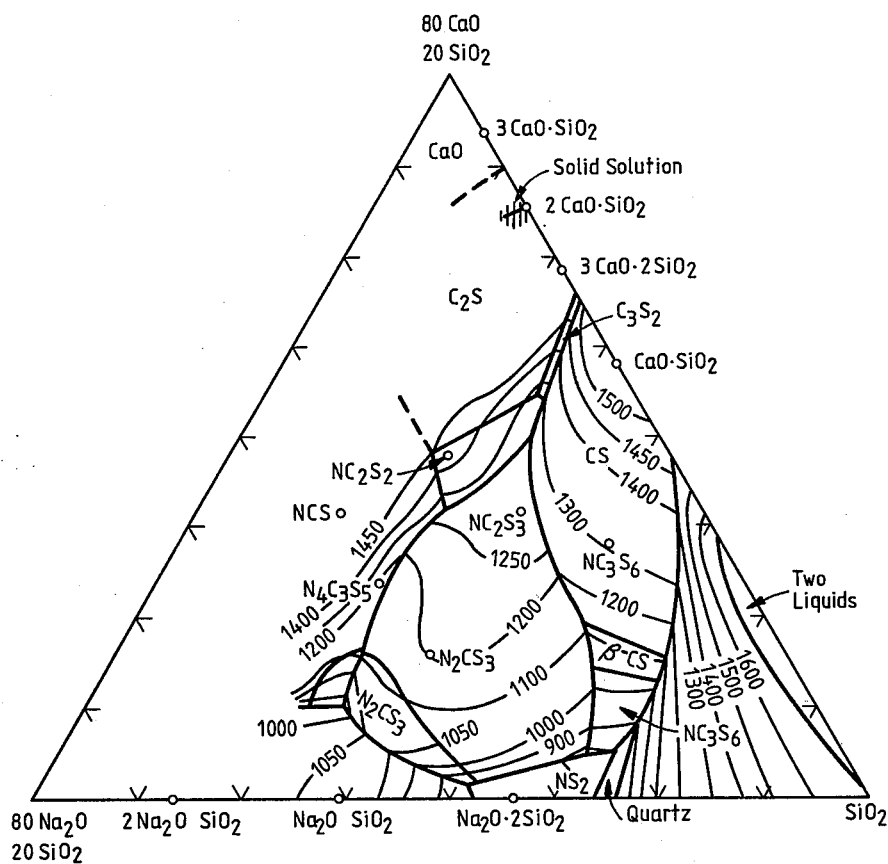
FIG. 2 illustrates a phase diagram of the system $Na_2O$—$CaO$—$SiO_2$.

Mo removal can thus be started when the Cr content is less than one percent. Mo removal into the slag requires a slag containing sodium. The recommended refining slag composition is shown in a phase diagram of $Na_2O$—$CaO$—$SiO_2$ in FIG. 2.

In order to remove Mo slagging components silica sand, lime and soda ash are added so that the basicity is 2.5-3 and $Na_2O:CaO = 2:1$. Oxidization is made by using $Fe_2O_3$ and/or oxygen.

In the first treatment the Mo content of the metal phase is decreased to 0.2-0.5% from some 1.5%. Slagging is done and the treatment repeated as before. After the second treatment the Mo content of the metal phase could reach a level of less than 0.05% even when the Mo content of the scrap initially was considerably higher than the above-mentioned 1.5%.

In the Mo removal stage the temperature of the melt should be as low as possible, but, however, sufficiently high to keep up a good fluidity, i.e. in practice 1450-1500° C.

The total amount of slagging material components used in the Mo removal is 3-4% of the molten scrap amount and the amount soda ash 5-6% accordingly while the $Fe_2O_3$ pellet requirement concerning oxygen content is 75% of the total oxygen need. The remaining oxygen is fed in the form of gaseous oxygen.

In order to speed up the chemical reactions, the melt should be effectively mixed. This is achieved by feeding oxygen under the surface of the melt and with the aid of the electric arc in connection with regulation of the melt temperature. A more effective method of achieving a good mix and, at the same time, quick and complete chemical reactions is to inject the additives direct into the melt while mixing mechanically or by using indirect agitating methods.

Results of the refining process

The following gives the results of and the deductions based on the tests on a practical scale made in a five-tonne electric arc furnace using scrap qualities the analyses of which varied as follows: Ni 8-21%, Co 19-49%, Cr 18-30%, W 2.5-8%, Mo 1.3-3%, Fe 4-30%. The scrap lots were either totally in the form of turnings or totally in the form of coarse cast solids.

The tests were concentrated only on refining the metal phase. The refining of metals separated into the slag was not studied. The results confirmed well the preceding theoretic studies.

(1) The Ni+Co content in the metal phase increased 1.40-1.95-fold from the initial level and to 92.8% at its best when, at the same time, the Fe content decreased from 19% to 6.8%. In the tests $Fe_2O_3$ pellets and oxygen were used as oxidizers.

(2) The Ni recovery into the final metal phase varied between 81% and 95%.

(3) The Co recovery into the final products was between 70 and 80%.

(4) Cr losses in the final metal phase product varied between 0.02-1.5%, the Cr content being 0.01-0.04%.

(5) 0.7-2.6% of the total W amount remained in the metal phase with about 0.08% W.

(6) Mo losses in the metal phase were about 0.4-1% the Mo content being 0.03-0.05%.

(7) The total treatment time, from starting the charging the furnace to casting of the metal phase, was between two and three hours.

(8) The Cr content of slags from the various treatments was

| first slag | 35-40% Cr |
| second slag | 18-20% Cr |
| third slag | 13-15% Cr |

(9) The W content of slags was:

| first slag | about 0.3% W |
| second slag | 5-7% W |
| third slag | 3-4.5% W |
| fourth slag | 1.5-4% W |

(10) The Mo content of slags was:

| Cr + W removal slags | very low |
| first Mo-treatment slag | 1.5-1.8% Mo |
| second Mo-treatment slag | 2-3% Mo |

What is claimed is:

1. A process for selectively recovering metal values from nickel or cobalt based alloy scrap containing chromium and tungsten, by mixing a melt of the scrap with oxidizing and slaggin agents and separating slags from molten metal, comprising:
   (a) first oxidizing the metal melt to such an extent that tungsten will remain substantially unoxidized, maintaining a slag basicity of 2-2.5%, and removing a chormium containing slag so formed;
   (b) further oxidizing the metal melt from step (a) to such an extent that tungsten passes into a slag and removing a slag containing chromium and tungsten so formed;
   (c) further oxidizing the metal melt from step (b) at a slag basicity of 1.5-2.0 to bring the chromium content thereof to 0.5-1% and removing the slag so formed;
   (d) repeatedly oxidizing the metal melt from step (c) in admixture with a sodium containing slagging agent to obtain a slag basicity of 2.5-3, and removing a slag after each treatment in order to produce a substantially pure alloy melt of cobalt, nickel, or both.

2. The process of claim 1, wherein molybdenum is present in the alloy scrap, and wherein such molybdenum passes into the slags produced in the oxidizing processes of step (d).

3. The process of claim 1, in which one or more of titanium, aluminum, tantalum and vanadium is also present in the alloy scrap and is removed as a component of the slag produced by oxidizing.

4. The process of claim 1 or 2, wherein oxidation and mixing of the metal melt is effected by injecting oxygen under the surface of the melt.

5. The process of claim 1 or 2, wherein oxidation of the metal melt is effected by mixing ferric oxide with the melt.

6. The process of claim 1 or 2, wherein the smelting and oxidation of the scrap metal is carried out in an electric arc furnace which is tilted for removing the slag after each step.

7. The process of claim 1 or 2, wherein so much sodium containing slagging agent is added in step (d) that the ratio $Na_2O:CaO$ in the slag is about 2:1.

8. The process of claim 1 or 2, comprising maintaining the temperature of the melt at 1450°-1500° C.

9. The process of claim 1 or 2, comprising injecting the oxidating and slagging agents into the melt and mechanically mixing the melt.

10. The process of claim 2 or 3, comprising oxidizing and slagging the alloy scrap to such an extent that the alloy melt from step (d) contains less than 0.05% of Cr, Mo, and W, respectively.

* * * * *

UNITED STATES PATENT AND TRADEMARK OFFICE
CERTIFICATE OF CORRECTION

PATENT NO. : 4,466,826
DATED : August 21, 1984
INVENTOR(S) : Osmo Vartiainen

It is certified that error appears in the above-identified patent and that said Letters Patent is hereby corrected as shown below:

Column 8 - Claim 1, line 5:

"and slaggin agents" should read:

--and slagging agents--.

Signed and Sealed this

Eighth Day of January 1985

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,466,826
DATED : August 21, 1984
INVENTOR(S) : Osmo Vartiainen

It is certified that error appears in the above-identified patent and that said Letters Patent is hereby corrected as shown below:

Column 3, line 64:

The last sentence beginning "In the pra-" should read:

--In the prac- --.

Column 4, line 28:

The word "oxygen" is omitted. "not only can be used" should read --not only oxygen can be used--.

Column 5, line 25:

The word "after" is omitted. "casting machine refining" should read: --casting machine after refining--.

Signed and Sealed this

Nineteenth Day of February 1985

[SEAL]

*Attest:*

DONALD J. QUIGG

*Attesting Officer*     *Acting Commissioner of Patents and Trademarks*